(12) United States Patent
Yamashita et al.

(10) Patent No.: US 10,052,842 B2
(45) Date of Patent: Aug. 21, 2018

(54) COMPOSITE STRUCTURE AND MANUFACTURING METHOD THEREOF

(71) Applicants: AISIN TAKAOKA CO., LTD., Toyota-shi, Aichi (JP); TOYOTA JIDOSHA KABUSHIKI KAISHA, Toyota-shi, Aichi (JP)

(72) Inventors: Yuji Yamashita, Toyota (JP); Kiyohito Kondo, Toyota (JP); Takeki Matsumoto, Toyota (JP); Hirokazu Kawabe, Toyota (JP); Yoshiteru Inamoto, Toyota (JP)

(73) Assignees: AISIN TAKAOKA CO., LTD., Toyota-Shi, Aichi (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 0 days.

(21) Appl. No.: 15/125,518

(22) PCT Filed: Mar. 11, 2015

(86) PCT No.: PCT/IB2015/051752
§ 371 (c)(1),
(2) Date: Sep. 12, 2016

(87) PCT Pub. No.: WO2015/136452
PCT Pub. Date: Sep. 17, 2015

(65) Prior Publication Data
US 2017/0291387 A1    Oct. 12, 2017

(30) Foreign Application Priority Data
Mar. 13, 2014    (JP) ................................ 2014-050752

(51) Int. Cl.
*B32B 5/12*    (2006.01)
*B29C 70/08*    (2006.01)
(Continued)

(52) U.S. Cl.
CPC .............. *B32B 5/12* (2013.01); *B29C 70/088* (2013.01); *B29C 70/46* (2013.01); *B32B 5/024* (2013.01);
(Continued)

(58) Field of Classification Search
CPC ....................................................... B32B 5/12
(Continued)

(56) References Cited

U.S. PATENT DOCUMENTS 4,770,929 A    9/1988    Nobumasa et al.
5,854,142 A    12/1998    Inoguchi et al.
(Continued)

FOREIGN PATENT DOCUMENTS

CN    1141236 A    1/1997
CN    1701831 A    11/2005
(Continued)

OTHER PUBLICATIONS

International Search Report (PCT/ISA/210) dated Jun. 1, 2015, by the European Patent Office as the International Searching Authority for International Application No. PCT/IB2015/051752.
(Continued)

*Primary Examiner* — Brent T O'Hern
(74) *Attorney, Agent, or Firm* — Buchanan Ingersoll & Rooney PC

(57) ABSTRACT

A composite structure having a laminated structure made of fiber reinforced plastic and metallic material comprises a base member(s) made of metallic material; and a reinforcement member(s) made of fiber reinforced plastic, the reinforcement member(s) comprising: a first reinforcement part(s) made of fiber reinforced plastic including reinforcement fibers which are aligned in a uni-direction, and a second reinforcement part(s) made of fiber reinforced plastic including at least reinforcement fibers which are aligned in (Continued)

a crossing direction relative to the uni-direction in which the reinforcement fibers of the first reinforcement part(s) are aligned, and interposed between the base member(s) and the first reinforcement part(s), the reinforcement member(s) further comprising a thermosetting resin included in a bonding site with the base member(s).

4 Claims, 5 Drawing Sheets

(51) Int. Cl.
*B29C 70/46* (2006.01)
*B32B 5/02* (2006.01)
*B32B 15/08* (2006.01)
*B32B 15/14* (2006.01)
*B32B 5/26* (2006.01)
*B32B 7/00* (2006.01)

(52) U.S. Cl.
CPC ............ *B32B 5/028* (2013.01); *B32B 5/26* (2013.01); *B32B 7/005* (2013.01); *B32B 15/08* (2013.01); *B32B 15/14* (2013.01); *B32B 2260/023* (2013.01); *B32B 2260/046* (2013.01); *B32B 2262/106* (2013.01); *B32B 2305/076* (2013.01)

(58) Field of Classification Search
USPC ........................................................ 428/105
See application file for complete search history.

(56) References Cited

U.S. PATENT DOCUMENTS

| | | | |
|---|---|---|---|
| 7,281,993 | B2 | 10/2007 | Oyama |
| 7,468,005 | B2 | 12/2008 | Kouno et al. |
| 7,862,453 | B2 | 1/2011 | Kouno et al. |
| 7,905,799 | B2 | 3/2011 | Kouno et al. |
| 2005/0245328 | A1 | 11/2005 | Kouno et al. |
| 2009/0139643 | A1* | 6/2009 | Kouno ............... A63B 53/0466 156/245 |
| 2009/0176600 | A1 | 7/2009 | Kouno et al. |
| 2015/0064409 | A1 | 3/2015 | Takeuchi et al. |

FOREIGN PATENT DOCUMENTS

| | | |
|---|---|---|
| CN | 201148018 Y | 11/2008 |
| CN | 202805844 U | 3/2013 |
| JP | S-63-70565 | 3/1988 |
| JP | H-7-165109 A | 6/1995 |
| JP | H-7-198299 A | 8/1995 |
| JP | 2005261582 A | 9/2005 |
| JP | 2005-312646 A | 11/2005 |
| JP | 2006-272656 A | 10/2006 |
| JP | 2009-119863 A | 6/2009 |
| JP | 2009-534231 A | 9/2009 |
| JP | 2010-149350 A | 7/2010 |
| WO | WO 2013/146900 A1 | 10/2013 |

OTHER PUBLICATIONS

Written Opinion (PCT/ISA/237) dated Jun. 1, 2015, by the European Patent Office as the International Searching Authority for International Application No. PCT/IB2015/051752.

Japanese Office Action dated Jan. 26, 2016, issued by the Japanese Patent Office in the corresponding Japanese Patent Application No. 2014-050752. (with English translation)(5 pages).

Japanese Office Action dated May 26, 2016, issued by the Japanese Patent Office in the corresponding Japanese Patent Application No. 1450155-5. (with English translation) (6 pages).

Office Action (First) dated Jun. 26, 2017, by the State Intellectual Property Office of the Peoples Republic of China in corresponding Chinese Patent Application No. 201580013503.5, and an English translation of the Office Action.

* cited by examiner

[Fig. 1]
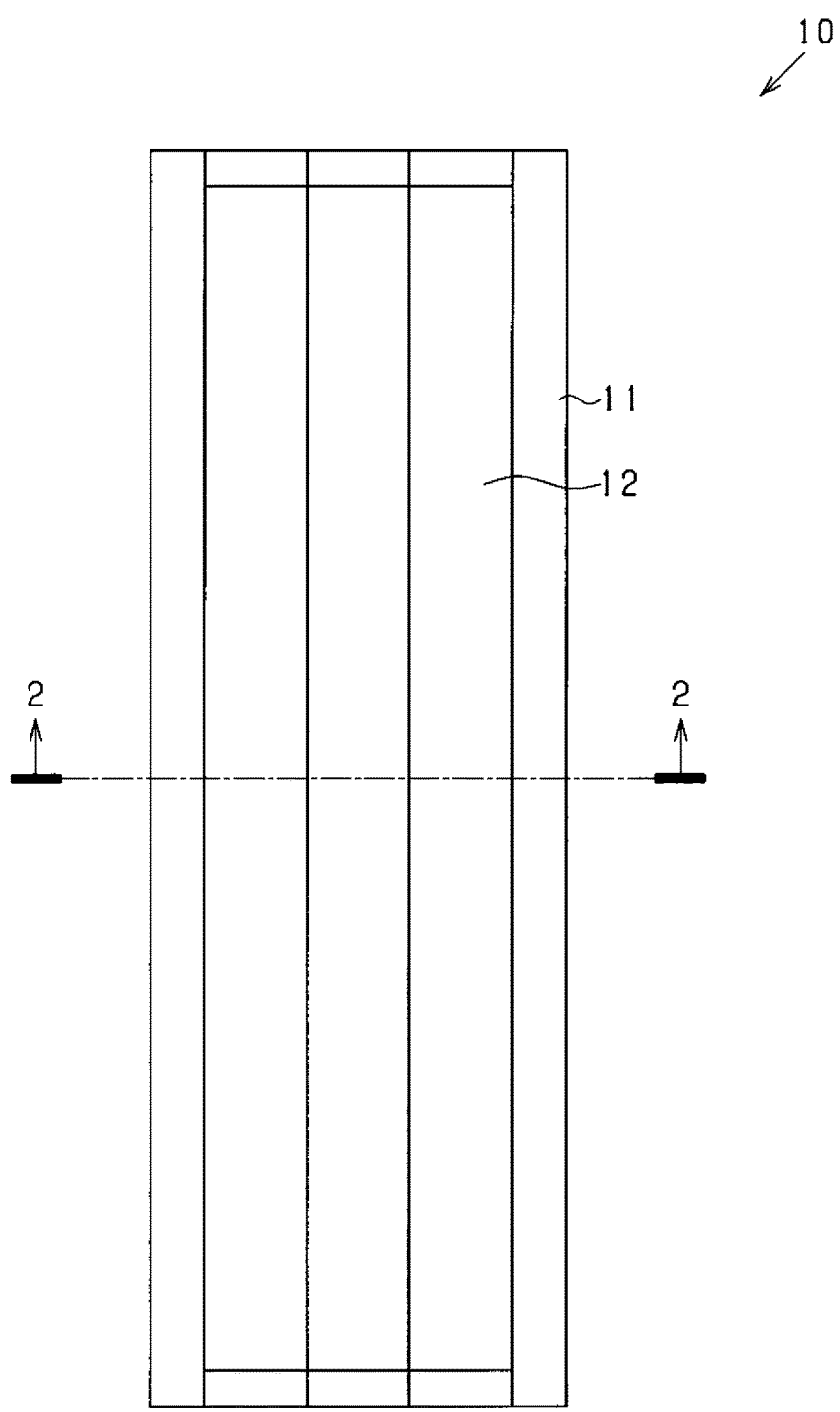

[Fig. 2]
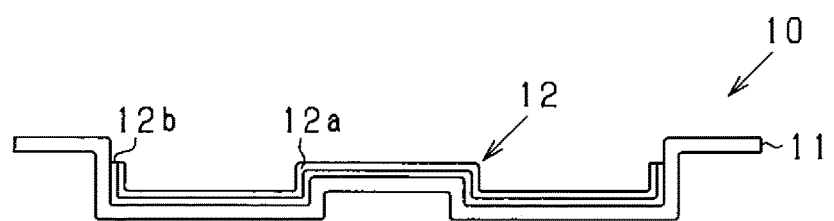
[Fig. 3]
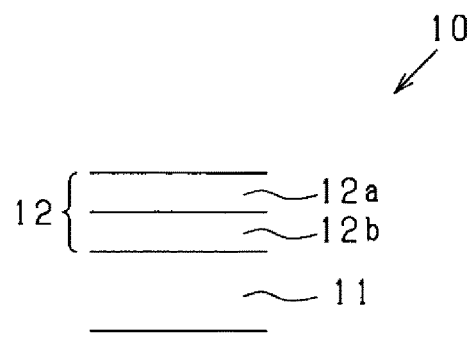

[Fig. 4]
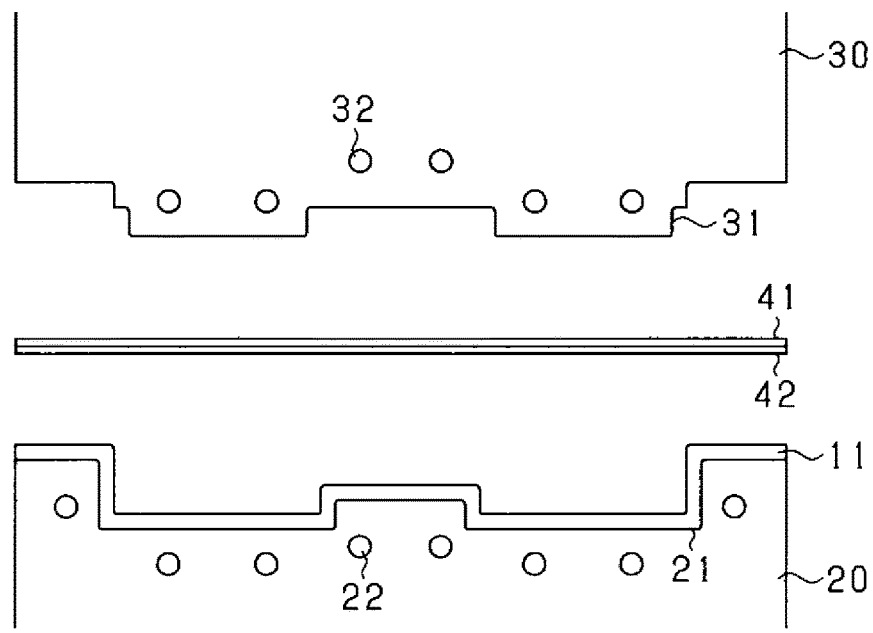
[Fig. 5]
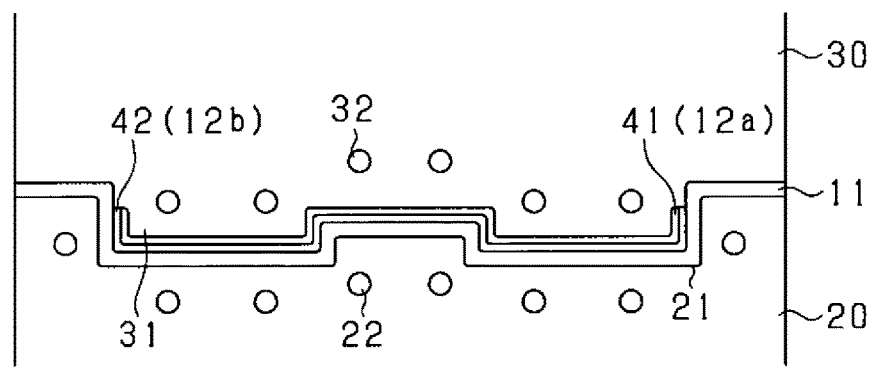

[Fig. 6]
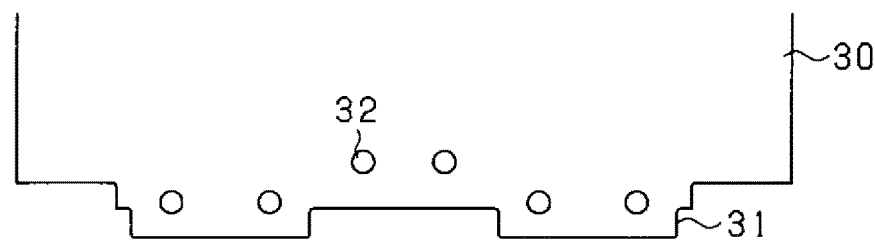
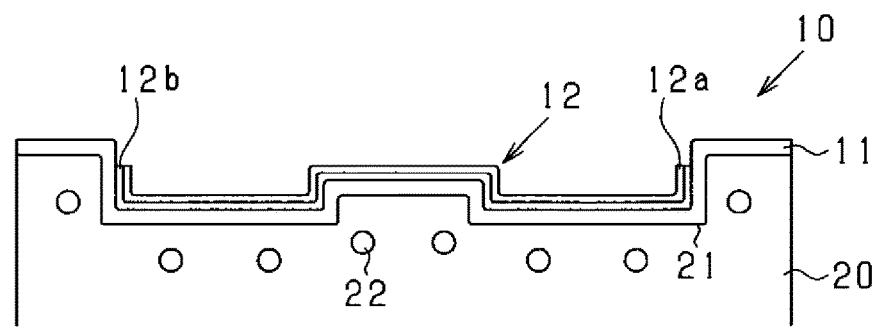
[Fig. 7]
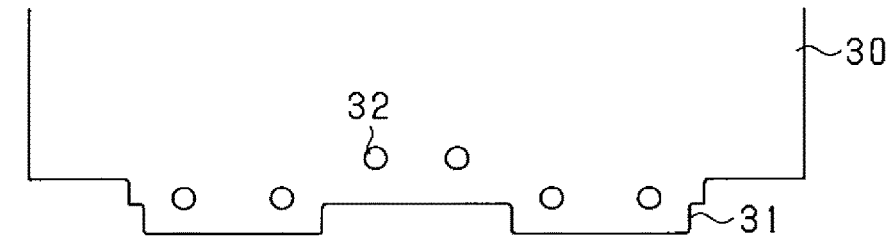
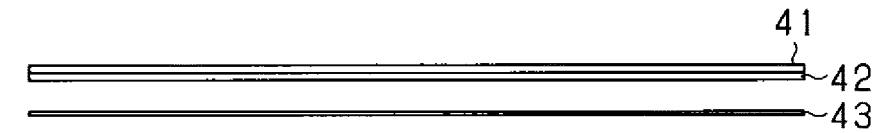
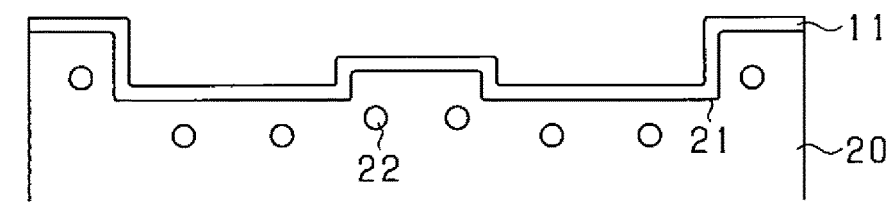

[Fig. 8]
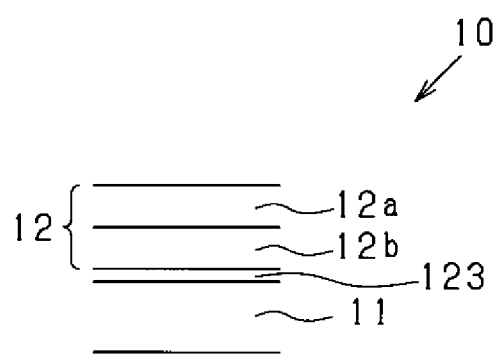

COMPOSITE STRUCTURE AND MANUFACTURING METHOD THEREOF

CROSS-REFERENCE TO RELATED APPLICATIONS

The present application claims priority based on JP Patent Application No. 2014-050752, filed in Japan on Mar. 13, 2014, whose entire disclosure is incorporated herein by reference thereto.

The present disclosure relates to a composite structure made of metallic material and fiber reinforced plastic and a manufacturing method thereof.

FIELD

Background

Those kinds of composite structure and manufacturing method thereof are known, for example, as disclosed in JP2010-149350A and WO2013-146900A.
PTL (Patent Literature) 1
JP2010-149350A
PTL 2
WO2013-146900A

SUMMARY

The following analysis is given by the present invention.

In those kind of composite structure, a bonding site between a fiber reinforced plastic part and a metallic part has a problem with occurrence of strain or delamination, particularly, due to a difference in a thermal expansion coefficient between the two parts. The present invention is made in view of the situation etc. as exemplified hereinabove.

Considering the hereinabove situation, in a first aspect, there is provided a composite structure having a laminated structure made of fiber reinforced plastic and metallic material, comprising: a base member(s) made of metallic material; and a reinforcement member(s) made of fiber reinforced plastic. The reinforcement member(s) comprises: a first reinforcement part(s) made of fiber reinforced plastic including reinforcement fibers which are aligned in a uni-direction, and a second reinforcement part(s) made of fiber reinforced plastic including at least reinforcement fibers which are aligned in a crossing direction relative to the uni-direction in which the reinforcement fibers of the first reinforcement part(s) are aligned, and interposed between the base member(s) and the first reinforcement part(s). The reinforcement member(s) further comprises a thermosetting resin included in a bonding site with the base member(s).

In fiber reinforced plastic, there is a difference in an amount of thermal expansion or cooling shrinkage between in an orientation direction of reinforcement fibers (hereinafter, may be referred to simply as "orientation direction") and in a direction crossing (typically orthogonally) the orientation direction. Using uni-directional fiber reinforced plastic, so-called "UD (uni-directional) material", an anisotropy of the expansion or shrinkage is generated depending on the orientation direction. In the UD material, the amount of the expansion or shrinkage in the direction orthogonally crossing the orientation direction is larger than that amount in the orientation direction. Such anisotropy causes the strain or delamination at the bonding site.

In a composite structure according to the first aspect, the reinforcement member(s) bonded with the base member(s) has the first and second reinforcement parts (layers), with including the thermosetting resin in the bonding site with the base member(s), in which orientation directions of the reinforcement fibers included in the first and second reinforcement parts cross each other. Accordingly, bonding between the base member(s) and the reinforcement member(s) is easily or firmly conducted, and expansion and shrinkage of the reinforcement member(s) upon heating and cooling are as isotropic as possible. Thus, the composite structure can obtain fiber reinforcement properties presented by the UD material in the orientation direction thereof, with suppressing occurrence of strain or delamination at the bonding site.

In a preferred composite structure, the second reinforcement part(s) including the thermosetting resin is directly bonded with the base member(s). According to such preferred configuration, the composite structure having the hereinabove-mentioned configuration according to the first aspect is produced through an easy or simply manufacturing process.

In a preferred composite structure, the first reinforcement part(s) including a thermosetting resin is directly bonded with the second reinforcement part(s). According to such preferred configuration, the composite structure having the hereinabove-mentioned configuration is produced through an easy or simply manufacturing process.

In a preferred composite structure, the second reinforcement part(s) comprises a cloth member(s), in which reinforcement fibers included in the cloth member(s) is used as the reinforcement fibers of the second reinforcement part(s). According to such preferred configuration, in the second reinforcement part(s) arranged on a base member side of the reinforcement member, expansion and shrinkage upon heating and cooling are as isotropic as possible. Thus, strain or delamination generated at the bonding site is further suppressed.

In a preferred composite structure, at least one of the first and second reinforcement parts is made of carbon fiber reinforced plastic. The preferred composite structure having such configuration can have the hereinabove-mentioned advantageous characteristic.

In a second aspect, there is provided a manufacturing method of the composite structure having a laminated structure made of fiber reinforced plastic and metallic material, comprising:

(i) laminating a base member(s) made of metallic material; a first reinforcement part precursor(s) formed of a prepreg(s) which is made of a fiber reinforced plastic including reinforcement fibers which are aligned in a uni-direction; and a second reinforcement part precursor(s) formed of a prepreg(s) which is made of fiber reinforced plastic including at least reinforcement fiber which are aligned in a crossing direction relative to the uni-direction in which the reinforcement fibers of the first reinforcement part precursor(s) are aligned, each other, by interposing the second reinforcement part precursor(s) between the base member(s) and the first reinforcement part precursor(s); and (ii) heating the laminated structure produced by the laminating, having a base member(s), the first reinforcement part precursor(s) and the second reinforcement part precursor(s).

In a preferred manufacturing method of the composite structure, the laminating comprises: directly bonding the second reinforcement part precursor(s) including thermosetting a resin before curing with the base member(s); and directly bonding the second reinforcement part precursor(s) with the first reinforcement part precursor(s) including a thermosetting resin before curing; thereby producing the laminated structure.

In a preferred manufacturing method of the composite structure, wherein, (i) the laminating comprises:

(ia) setting the first and second reinforcement part precursors having sheet shapes between the base member(s) set in one die of a pair of dies and another die of the pair of the dies; and (ib) closing the pair of the dies to form the hereinabove-mentioned laminated structure, thereby forming the first and second reinforcement part precursors into a preset shape(s), and wherein (ii) the heating comprises:

heating the laminated structure heated in the pair of the dies which is closed.

In a preferred manufacturing method of the composite structure, the second reinforcement part(s) comprises a cloth member(s), in which reinforcement fibers included in the cloth member(s) is used as the reinforcement fibers of the second reinforcement part(s).

In a preferred manufacturing method of the composite structure, at least one of the first and second reinforcement part precursor(s) is formed as a prepreg(s) made of carbon fiber reinforced plastic.

According to the hereinabove-mentioned preferred methods, the hereinabove-mentioned preferred composite structures are produced through an easy or simply manufacturing process.

BRIEF DESCRIPTION OF DRAWINGS

FIG. 1 is a schematic plan view illustrating an approximate configuration of a composite structure according to one exemplary embodiment.

FIG. 2 is a schematic cross-sectional view taken along a line 2-2 in FIG. 1.

FIG. 3 is a schematic partially enlarged view illustrating the composite structure of FIG. 2.

FIG. 4 is a schematic view illustrating a manufacturing method according to the one exemplary embodiment.

FIG. 5 is a schematic view illustrating the manufacturing method according to the one exemplary embodiment.

FIG. 6 is a schematic view illustrating the manufacturing method according to the one exemplary embodiment.

FIG. 7 is a schematic view illustrating the manufacturing method according to the one exemplary embodiment.

FIG. 8 is a schematic cross-sectional enlarged view illustrating the composite structure produced by the manufacturing method as shown in FIG. 7.

PREFERRED MODES

Hereinafter, one exemplary embodiment is explained, referring to drawings. In addition, modifications and/or variations are indicated at the end of Description, since the understanding of the explanation of the consistent one exemplary embodiment would be disturbed when such modifications and/or variations are inserted in the explanation of the exemplary embodiment.

<Constitution of Composite Structure>

FIG. 1 is a schematic plan view illustrating an approximate configuration of a composite structure according to one exemplary embodiment. FIG. 2 is a schematic cross-sectional view taken along a line 2-2 in FIG. 1. FIG. 3 is a schematic partially enlarged view illustrating the composite structure of FIG. 2. Hereinafter, referring to FIGS. 1-3, the composite structure according to the one exemplary embodiment is explained.

The composite structure 10 having a preset longitudinal direction (parallel to an up-down direction in a figure) as shown in FIG. 1 is formed in a hat shape (corrugated sheet shape) as shown in FIG. 2. The composite structure 10 has a base member 11 formed by bending a metallic sheet blank made of metallic material into the shape hereinabove mentioned, and a reinforcement member 12 including CFRP (carbon fiber reinforced plastic) and bonded with the base member 11. Thus, the composite structure 10 has a lamination (bonding) constitution made of the CFRP and the metallic material.

In the present exemplary embodiment, the composite structure 10 is assumed to be required to have reinforcement in the longitudinal direction. In the composite structure 10, for that assumption according to the present exemplary embodiment, the reinforcement member 12 is only arranged on a region(s) required preset strength and neighboring region of the region(s), but not arranged on the other parts, e.g., end region in a width direction orthogonal to the longitudinal direction, and so on.

The reinforcement member 12 has first and second reinforcement parts 12a, 12b. The first reinforcement part 12a (made of CFRP) is formed of so-called UD material member(s), thereby including a thermosetting resin and continuous or long carbon fibers (filaments) aligned in a uni-direction. To reinforce the composite structure 10 in the longitudinal direction as to the hereinabove-mentioned situation, an orientation direction of reinforcement fibers in the first reinforcement part 12a is aligned in (e.g., parallel to) the hereinabove longitudinal direction of the composite structure 10. The second reinforcement part 12b (made of CFRP) is formed of a cloth member(s) (material), thereby including a thermosetting resin and plain-woven reinforcement fibers. In the plain-woven reinforcement fibers, warp and woof fibers are obliquely aligned to the hereinabove-mentioned longitudinal direction of the composite structure 10 at approximate 45 degrees, respectively.

As shown in FIGS. 2 and 3, the second reinforcement part 12b is disposed to be interposed between the base member 11 and the first reinforcement part 12a. The first and second reinforcement parts 12a, 12b are directly bonded each other without an additional adhesive layer. Therefore, the reinforcement member 12 is configurated to contain the thermosetting resin in a bonding site with the base member 11.

<Manufacturing Method>

Hereinafter, a manufacturing method of the composite structure 10 having the hereinabove-mentioned constitution is explained, referring to FIGS. 4-6.

A concave part, i.e., a cavity 21 is formed on a lower die 20, i.e., a fixed die (outer die) of a pair of dies. The lower die 20 has an inner wall surface capable of abutting on an outer side surface (the opposite side surface of the hereinabove mentioned inner side surface bonded with the reinforcement member 12) of the base member 11. Inside the lower die 20, heaters 22 for heating are arranged along the inner wall surface of the cavity 21.

Convex parts 31 are formed on an upper die 30, i.e., a movable die (inner die) of a pair of dies. Convex parts 31 have shapes corresponding to the inner side surface of the base member 11, respectively. Inside the upper die 20, heaters 32 for heating are arranged along the outer wall surface of the convex part 31.

First, as shown in FIG. 4, the base material 11 of metallic component is set or disposed in the lower die 20. First and second prepregs 41, 42 are set between the upper die 30 and the lower die 20 in which the base member 11 has been set, in order that the second prepreg 42 is sandwiched between the base member 11 and the first prepreg 41. The first prepreg 41 is formed of the UD material member(s) including the thermosetting resin before curing, as a first reinforcement part (12a) precursor of the present disclosure. The second prepreg 42 is formed of the cloth member(s) with including the thermosetting resin before curing, as a second reinforcement part (12b) precursor of the present disclosure.

Second, as shown in FIG. 5, the upper and lower dies 20, 30 are closed each other. Thus, the first and second prepregs 41, 42 are laminated onto the base member 11 and formed into a hat shape complied with an inner surface profile of the base member 11. That process is called "a laminating process".

Next, in a state as shown in FIG. 5, the lamination structure of the first and second prepregs 41, 42 and the base member 11 is heated at a preset temperature for the preset time using the heaters 22, 32. That process is called "a heating process". Thereby, a curing reaction of the thermosetting resin included in the first and second prepregs 41, 42 proceeds, so that a first and second reinforcement parts 12a, 12b are formed, and the first and second reinforcement parts 12a, 12b and the base member 11 in this order are firmly bonded and laminated each other. Thereafter, as shown in FIG. 6, the upper and lower dies 20, 30 are opened to allow remove the formed composite structure 10 to remove from the dies 20, 30.

<Operation and Effect>

In the composite structure 10 according to the exemplary embodiment, the reinforcement member 12 bonded with the base member 11 has the first and second reinforcement parts 12a, 12b, in which orientation directions of reinforcement fibers of the first and second reinforcement parts 12a, 12b cross each other. Accordingly, expansion and shrinkage of the reinforcement member(s) upon heating and cooling are as isotropic as possible. Thus, the composite structure 10 can obtain fiber reinforcement properties presented by the UD material member(s) in the orientation direction thereof, with a suppressed occurrence of strain or delamination at the bonding site.

Particularly, in a case of bonding the CFRP member(s) including the thermosetting resin and the metallic component(s) each other as described in the present exemplary embodiment, both of shrinkages due to a curing reaction on manufacturing process and due to cooling after curing, as well as expansion and shrinkage in use environment of a completed product of the composite structure 10, offer problems. As to the problems, according to the configuration of the present exemplary embodiment, even when bonding the reinforcement member 12 formed of the CFRP member(s) including the thermosetting resin and the base member 11 formed of the metallic component(s), strain or delamination at the bonding site can be satisfactorily suppressed.

In the composite structure 10 of the present exemplary embodiment, the reinforcement member 12 includes the thermosetting resin in the bonding site with the base member 11. For example, the reinforcement member 12 including the thermosetting resin is directly bonded with the base member 11. According to the hereinabove-mentioned configuration, bonding between the base member 11 and the reinforcement member 12 can be well conducted, even if without applying a pretreatment for improving an adhesiveness of the reinforcement member 12 onto the base member 11 (surface treatment: e.g., plating, plasma treatment, and blasting etc.) or a special adhesion layer (bonding layer) arranged between the base member 11 and the reinforcement member 12.

Furthermore, in the composite structure 10 of the present exemplary embodiment, the first reinforcement part 12a including the thermosetting resin is directly bonded with the second reinforcement part 12b including the thermosetting resin, and the second reinforcement part 12b is directly bonded with the base member 11. According to such preferred configuration, the composite structure having the hereinabove-mentioned configuration can be produced through an easy or simply manufacturing process.

In addition, according to the composite structure 10 and the manufacturing method thereof, a forming process of the base member 11 and a bonding process between the formed base member 11 and the reinforcement member 12 can be simultaneously conducted, thus contributing to reduce a number of processes and a product cost thereby.

<Modifications>

Several modifications will next be exemplified. In the following description of the modifications, component members similar in structure and function to those of the hereinabove-described exemplary embodiment are denoted by names and reference numerals similar to those of the hereinabove-described exemplary embodiment. The description of the component members appearing in the hereinabove description of the embodiment can be applied as appropriate, so long as no technical inconsistencies are included. Needless to say, even modifications are not limited to those described below. The constitution of the hereinabove-described exemplary embodiment and the constitutions of the modifications to be described below are entirely or partially applicable in appropriate combination, so long as no technical inconsistencies are included.

The present invention is not limited to the specific configurations of the exemplary embodiment to be described hereinabove. The shape of the composite structure 10 is not limited to the hat shape as hereinabove-mentioned. For example, the composite structure 10 may have an approximately flat sheet shape. Further, the first and second reinforcement parts 12a, 12b are not limited to be formed of a CFRP member(s). Furthermore, the orientation direction of the first reinforcement part 12a may be set in a direction which inclines at a preset angle to the hereinabove-described longitudinal direction of the composite structure 10, depending on a direction of internal or external stress generated in actual use of the composite structure 10, etc.

In case that the second reinforcement part 12b is formed of cloth member (made of UD material), the second reinforcement part 12b is configured in which warp or woof fibers included in the cloth member(s) are approximately aligned orthogonally to the hereinabove-mentioned longitudinal direction of the composite structure 10. Occasionally, reinforcement fibers other than plain-woven, e.g., twill-woven reinforcement fibers may be used, as the reinforcement fibers including in the second reinforcement part 12b.

The present invention is not limited to the specific manufacturing method of the exemplary embodiment to be described hereinabove. For, example, the first and second prepregs 41, 42 may be separately inserted between the upper and lower dies 20, 30. Occasionally, the first and second prepregs 41, 42 may be pre-integrated or pre-bonded, before inserted between the upper and lower dies 20, 30.

The first and second prepregs 41, 42 may be pre-formed corresponding to the reinforcement member 12. In this case, the formed prepregs 41, 42 may be set in the lower die 20 together with the base member 11, before closing of the upper and lower dies 20, 30. Occasionally, instead of setting of the base member 11 in the lower die 20 as shown in FIG. 4, a metallic blank to form the base member 11 may be inserted between the second prepreg 42 and the lower die 20. In this case, dies-closing and heating thereafter (see FIG. 5)

may result in forming the base member 11 and the reinforcement member 12, simultaneously with bonding the two members 11, 12 each other.

The inner surface of the base member 11 may be processed with the pretreatment(s) mentioned hereinabove, especially if the second reinforcement part 12b is made of thermoplastic fiber reinforced plastic. In this case, the first reinforcement part 12a is often made of thermoplastic fiber reinforced plastic, too.

Using the second forcing member 12 made of the thermoplastic fiber reinforced plastic, an adhesive sheet (thermosetting resin precursor sheet) 43 made of thermosetting resin before curing may be inserted between the base member 11 and the second reinforcement part 12b. In this case, the second reinforcement part 12b may be bonded with the base member 11, via an adhesive layer 123 (formed from the adhesive sheet 43) made of the thermosetting resin, as shown in FIG. 8. According to the configuration and the manufacturing method, bonding between the base member 11 and the reinforcement member 12 having the second reinforcement part 12b made of the thermoplastic FRP can be well conducted, even if without the pretreatment(s) mentioned hereinabove on the inner surface of the base member 11.

Needless to say, those modifications which are not particularly referred to are also encompassed in the technical scope of the present invention, so long as the invention is not modified in essence. Those components which partially constitute means for solving the problems to be solved by the present invention and are operationally or functionally expressed encompass, not only the specific structures disclosed hereinabove in the description of the hereinabove exemplary embodiment and modifications, and equivalents thereof but also any other structures that can implement the operations or functions of the components.

The entire disclosures of the hereinabove Patent Literatures are incorporated herein by reference thereto. Modifications and adjustments of the exemplary embodiment(s) are possible within the scope of the overall disclosure (including the claims) of the present disclosure and based on the basic technical concept of the present disclosure. Various combinations and selections of various disclosed elements (including each element of each claim, each element of each exemplary embodiment, each element of each drawing, etc.) are possible within the scope of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range(s) are also concretely disclosed even without explicit recital thereof.

REFERENCE SIGNS LIST

10 composite (hybrid) structure
11 base member (layer)
12 reinforcement member (layer)
12a first reinforcement part (layer)
12b second reinforcement part (layer)
20 lower die
21 cavity
22 heater
30 upper die
31 protrusion
32 heater
41 first prepreg
42 second prepreg
43 adhesive sheet
123 adhesive layer

The invention claimed is:

1. A manufacturing method of a composite structure having a laminated structure made of fiber reinforced plastic and metallic material, comprising:
    laminating a base member(s) made of metallic material, having a hat shape; a first reinforcement part precursor(s) formed of a prepreg(s) which is made of a fiber reinforced plastic including reinforcement fibers which are aligned in a uni-direction; and a second reinforcement part precursor(s) formed of a prepreg(s) which is made of fiber reinforced plastic including at least reinforcement fibers which are aligned in a crossing direction relative to the uni-direction in which the reinforcement fibers of the first reinforcement part precursor(s) are aligned, each other, by interposing the second reinforcement part precursor(s) between the base member(s) and the first reinforcement part precursor(s), wherein the first and second reinforcement part precursors are arranged in a concave part of the hat shape of the base member(s) and complied with an inner surface profile of the concave part in order to bond the first and second reinforcement part precursors onto the base member(s); and
    heating the laminated structure produced by the laminating, having the base member(s), the first and second reinforcement part precursors, wherein
    the laminating comprises:
        setting the base member(s) in one die of a pair of dies;
        setting the first and second reinforcement part precursors having sheet shapes between the base member(s) and another die of the pair of the dies; and
        closing the pair of the dies to form the laminated structure, thereby forming the first and second reinforcement part precursors into a preset shape(s), and
    the heating comprises:
        heating the laminated structure heated in the pair of the dies which is closed.

2. The manufacturing method of the composite structure according to claim 1, wherein
    the laminating comprises:
    directly bonding the second reinforcement part precursor(s) including a thermosetting resin before curing with the base member(s); and
    directly bonding the second reinforcement part precursor(s) with the first reinforcement part precursor(s) including a thermosetting resin before curing;
    thereby producing the laminated structure.

3. The manufacturing method of the composite structure according to claim 1, wherein
    the second reinforcement part precursor(s) comprises a cloth member(s), in which reinforcement fibers included in the cloth member(s) is used as the reinforcement fibers of the second reinforcement part precursor(s).

4. The manufacturing method of the composite structure according to claim 1, wherein
    at least one of the first reinforcement part precursor(s) or the second reinforcement part precursor(s) is formed of a prepreg(s) made of carbon fiber reinforced plastic.

* * * * *